United States Patent
Gibson et al.

[19]

[11] Patent Number: 5,997,086
[45] Date of Patent: Dec. 7, 1999

[54] AUTOBASE FOR INFANT CAR SEAT

[75] Inventors: William R. Gibson, Kent; Paul K. Meeker, Hiram, both of Ohio

[73] Assignee: Evenflo Company, Inc., Vandalia, Ohio

[21] Appl. No.: 09/177,178

[22] Filed: Oct. 22, 1998

[51] Int. Cl.$^6$ ...................................................... B60N 2/26
[52] U.S. Cl. ...................................... 297/256.16; 297/130
[58] Field of Search ........................... 297/250.1, 256.16, 297/440.2, 440.1, 440.22, 130

[56] References Cited

U.S. PATENT DOCUMENTS

| | | |
|---|---|---|
| D. 289,465 | 4/1987 | Wise . |
| D. 294,310 | 2/1988 | Wise et al. . |
| D. 294,777 | 3/1988 | Wise et al. . |
| D. 311,822 | 11/1990 | Meeker . |
| D. 353,288 | 12/1994 | Kain . |
| D. 369,707 | 5/1996 | Kain . |
| D. 378,908 | 4/1997 | Courtney et al. . |
| 4,634,177 | 1/1987 | Meeker . |
| 4,943,113 | 7/1990 | Meeker ............................... 297/256.16 |
| 5,092,004 | 3/1992 | Cone et al. . |
| 5,104,134 | 4/1992 | Cone . |
| 5,133,567 | 7/1992 | Owens . |
| 5,277,472 | 1/1994 | Freese et al. . |
| 5,324,094 | 6/1994 | Kain . |
| 5,385,387 | 1/1995 | Kain . |
| 5,409,292 | 4/1995 | Kain et al. . |
| 5,478,135 | 12/1995 | Kain .................................... 297/256.16 |
| 5,516,190 | 5/1996 | Kain et al. . |
| 5,676,386 | 10/1997 | Huang . |
| 5,727,798 | 3/1998 | Walters et al. . |
| 5,794,951 | 8/1998 | Corley et al. . |

*Primary Examiner*—Anthony D. Barfield
*Attorney, Agent, or Firm*—Thompson Hine & Flory LLP

[57] ABSTRACT

A infant carrier base positionable on a vehicle seat for coupling and uncoupling with respect to an infant carrier. The base has an upper surface for the receipt of an infant carrier thereon and a lower surface for being received upon the seat of a vehicle. The base has a foot end, a head end, and generally parallel side walls therebetween. Coupling mechanisms on the base are cooperable with an infant carrier including a first coupling mechanism and a second coupling mechanism. The first coupling mechanism includes an inverted J-shaped hook extending upwardly from the foot end of the base. The hook is provided with an upwardly extending recess with an upper surface beneath the central portion of the hook adapted to receive the upper edge at the foot end of an infant carrier therein.

4 Claims, 15 Drawing Sheets

AUTOBASE FOR INFANT CAR SEAT

BACKGROUND OF THE INVENTION

1. Field of the Invention

The present invention relates to an infant carrier base positionable on a vehicle seat for coupling and uncoupling with respect to an infant carrier and more particularly pertains to coupling and uncoupling a base with respect to an infant carrier in a safer and more convenient manner.

2. Description of the Prior Art

The use of base systems for receiving infant carriers and other child care products of known designs and configurations is known in the prior art. More specifically, base systems for receiving infant carriers and other child care products of known designs and configurations heretofore devised and utilized for the purpose of coupling and uncoupling base systems, infant carriers, and other child care products with respect to each other are known to consist basically of familiar, expected, and obvious structural configurations, notwithstanding the myriad of designs encompassed by the crowded prior art which has been developed for the fulfillment of countless objectives and requirements.

While known prior art devices fulfill their respective, particular objectives and requirements, the aforementioned patents do not describe an infant carrier base positionable on a vehicle seat for coupling and uncoupling with respect to an infant carrier that allows coupling and uncoupling a base with respect to an infant carrier in a safer and more convenient manner.

In this respect, the an infant carrier base positionable on a vehicle seat for coupling and uncoupling with respect to an infant carrier according to the present invention substantially departs from the conventional concepts and designs of the prior art, and in doing so provides an apparatus primarily developed for the purpose of coupling and uncoupling a base with respect to an infant carrier in a safer and more convenient manner.

Therefore, it can be appreciated that there exists a continuing need for a new and improved an infant carrier base positionable on a vehicle seat for coupling and uncoupling with respect to an infant carrier which can be used for coupling and uncoupling a base with respect to an infant carrier in a safer and more convenient manner. In this regard, the present invention substantially fulfills this need.

SUMMARY OF THE INVENTION

In view of the foregoing disadvantages inherent in the known types of base systems for receiving infant carriers and other child care products of known designs and configurations now present in the prior art, the present invention provides an improved an infant carrier base positionable on a vehicle seat for coupling and uncoupling with respect to an infant carrier. As such, the general purpose of the present invention, which will be described subsequently in greater detail, is to provide a new and improved an infant carrier base positionable on a vehicle seat for coupling and uncoupling with respect to an infant carrier and method which has all the advantages of the prior art and none of the disadvantages.

To attain this, the present invention essentially comprises a new and improved base for the safe and convenient coupling and uncoupling between the base and the infant carrier and between the base and the seat of a vehicle through a seat belt. The base has an upper surface for the receipt of an infant carrier thereon. The lower surface of the base is adapted for being received upon the seat of a vehicle and retained thereon by a seat belt. The base has a foot end, a head end, and generally parallel side walls therebetween. Next provided are coupling mechanisms on the base. The coupling mechanisms are cooperable with an infant carrier and include a first coupling mechanism and a second coupling mechanism. The first coupling mechanism includes an inverted J-shaped hook extending upwardly from the foot end of the base. The hook provides an upwardly extending recess with a semicircular upper surface beneath the central curved portion of the hook adapted to receive the upper edge at the foot end of an infant carrier therein. The second coupling mechanisms include abutment surfaces. A downwardly facing abutment surface adjacent to the bottom of the base adjacent proximate to the head end is adapted for receiving upwardly facing abutment surfaces on an infant carrier.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved an infant carrier base positionable on a vehicle seat for coupling and uncoupling with respect to an infant carrier which has all of the advantages of the prior art base systems for receiving infant carriers and other child care products of known designs and configurations and none of the disadvantages.

It is another object of the present invention to provide a new and improved an infant carrier base positionable on a vehicle seat for coupling and uncoupling with respect to an infant carrier which may be easily and efficiently manufactured and marketed.

It is further object of the present invention to provide a new and improved an infant carrier base positionable on a vehicle seat for coupling and uncoupling with respect to an infant carrier which is of durable and reliable constructions.

An even further object of the present invention is to provide a new and improved an infant carrier base positionable on a vehicle seat for coupling and uncoupling with respect to an infant carrier which is susceptible of a low cost of manufacture with regard to both materials and labor, and which accordingly is then susceptible of low prices of sale to the consuming public, thereby making such an infant carrier base positionable on a vehicle seat for coupling and uncoupling with respect to an infant carrier economically available to the buying public.

Even still another object of the present invention is to provide a an infant carrier base positionable on a vehicle seat for coupling and uncoupling with respect to an infant carrier for coupling and uncoupling a base with respect to an infant carrier in a safer and more convenient manner.

Lastly, it is an object of the present invention to provide a new and improved infant carrier base positionable on a vehicle seat for coupling and uncoupling with respect to an infant carrier. The base has an upper surface for the receipt of an infant carrier thereon and a lower surface for being received upon the seat of a vehicle. The base has a foot end, a head end, and generally parallel side walls therebetween. Coupling mechanisms on the base are cooperable with an infant carrier including a first coupling mechanism and a second coupling mechanism. The first coupling mechanism includes an inverted J-shaped hook extending upwardly from the foot end of the base. The hook is provided with an upwardly extending recess with an upper surface beneath the central portion of the hook adapted to receive the upper edge at the foot end of an infant carrier therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
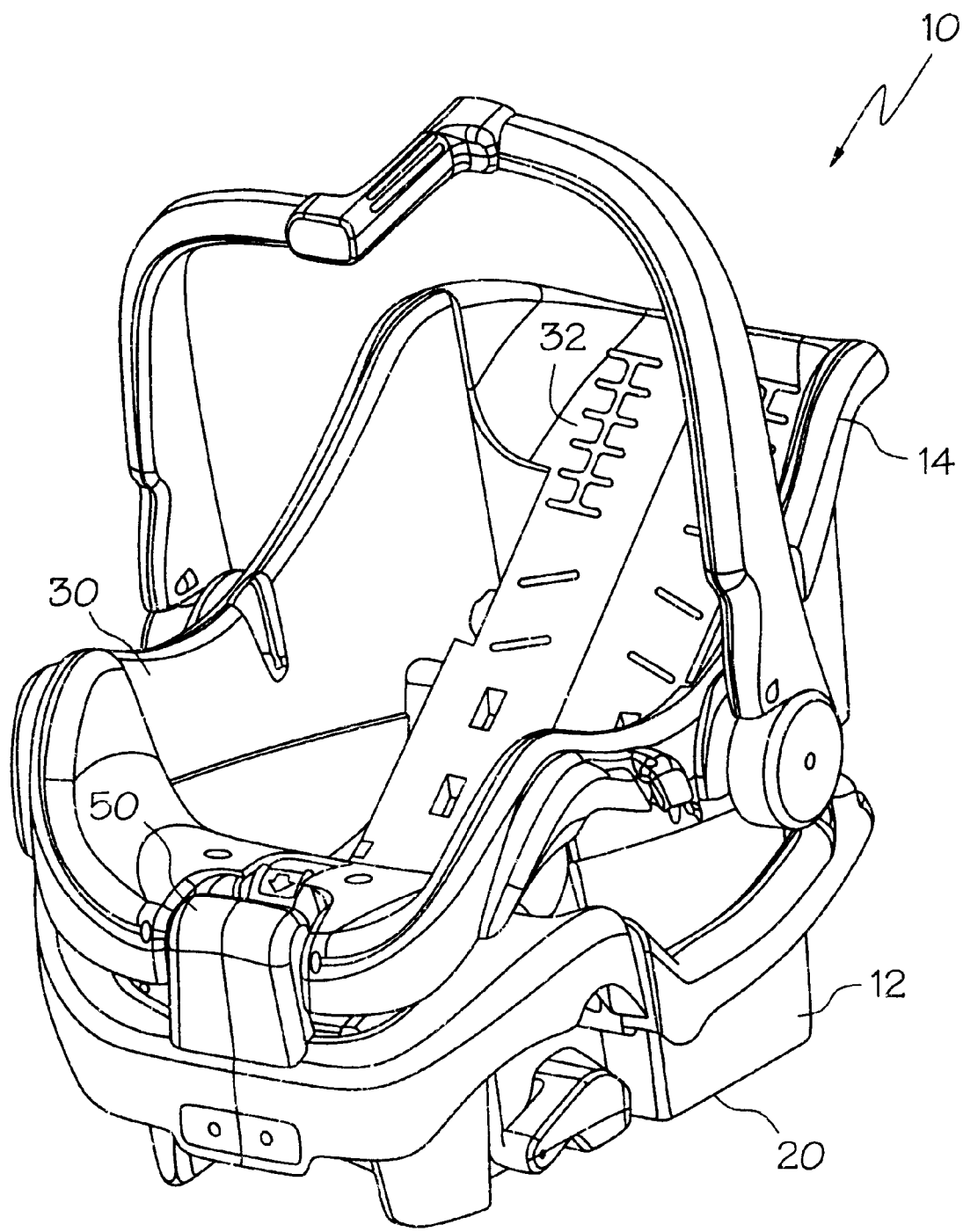
FIG. 1 is a perspective illustration of the new and improved infant carrier base positionable on a vehicle seat for coupling and uncoupling with respect to an infant carrier shown in systems configuration.
Figure 2:
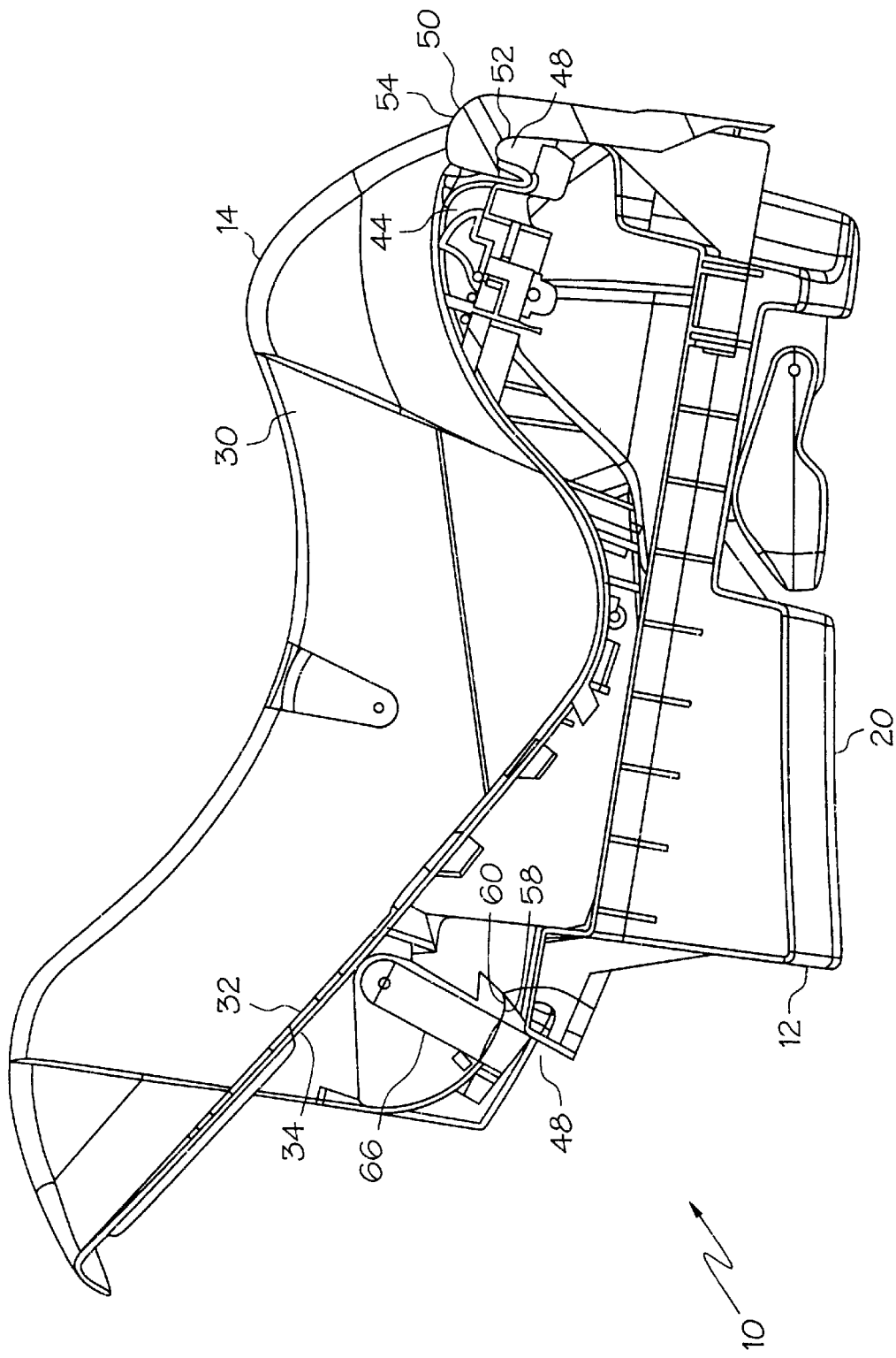
FIG. 2 is a side elevational view of the system shown in FIG. 1 with parts shown in cross-sectional configuration.
Figure 3:
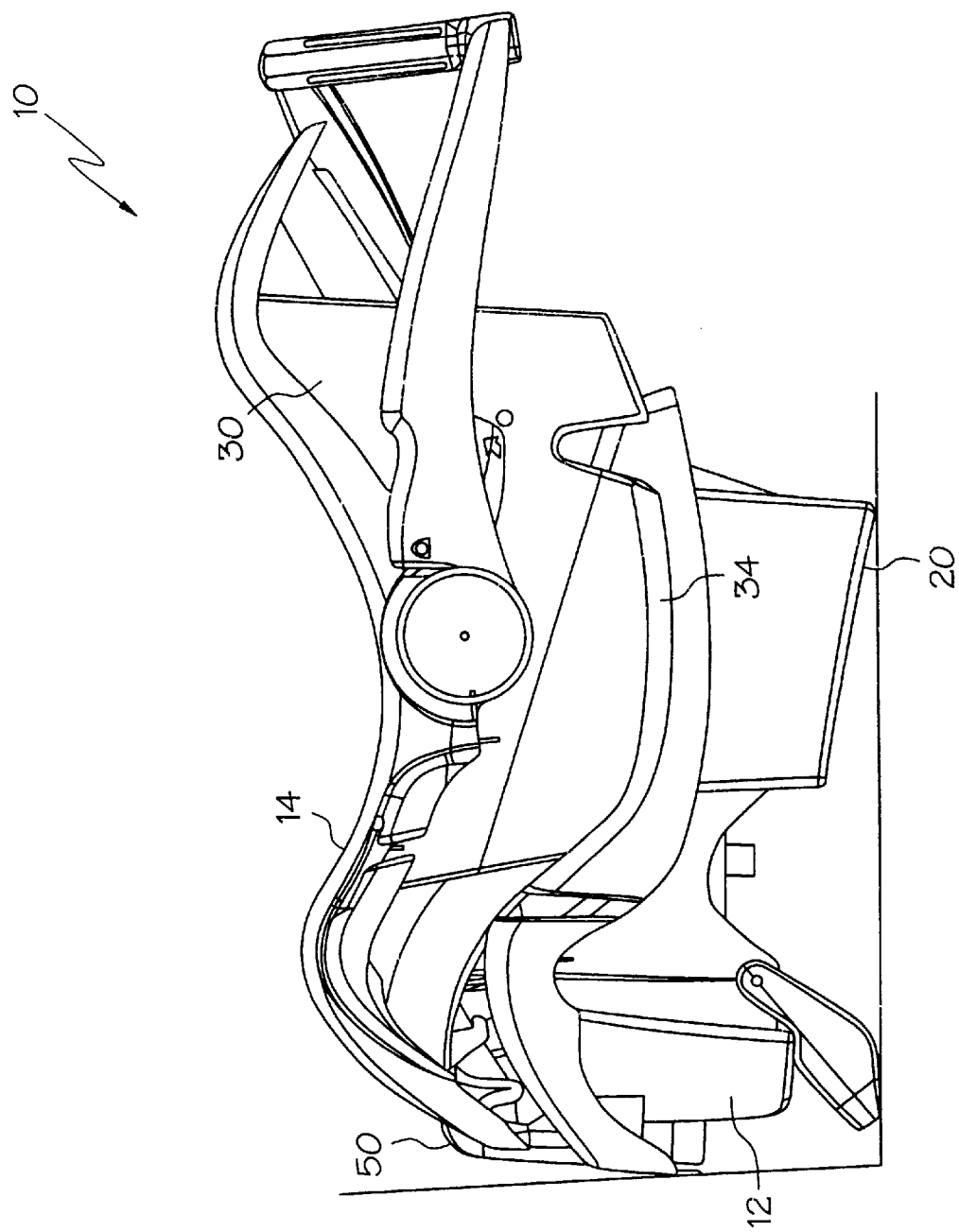
FIG. 3 is a side elevational view similar to FIG. 2 but with the foot extended.
Figure 4:
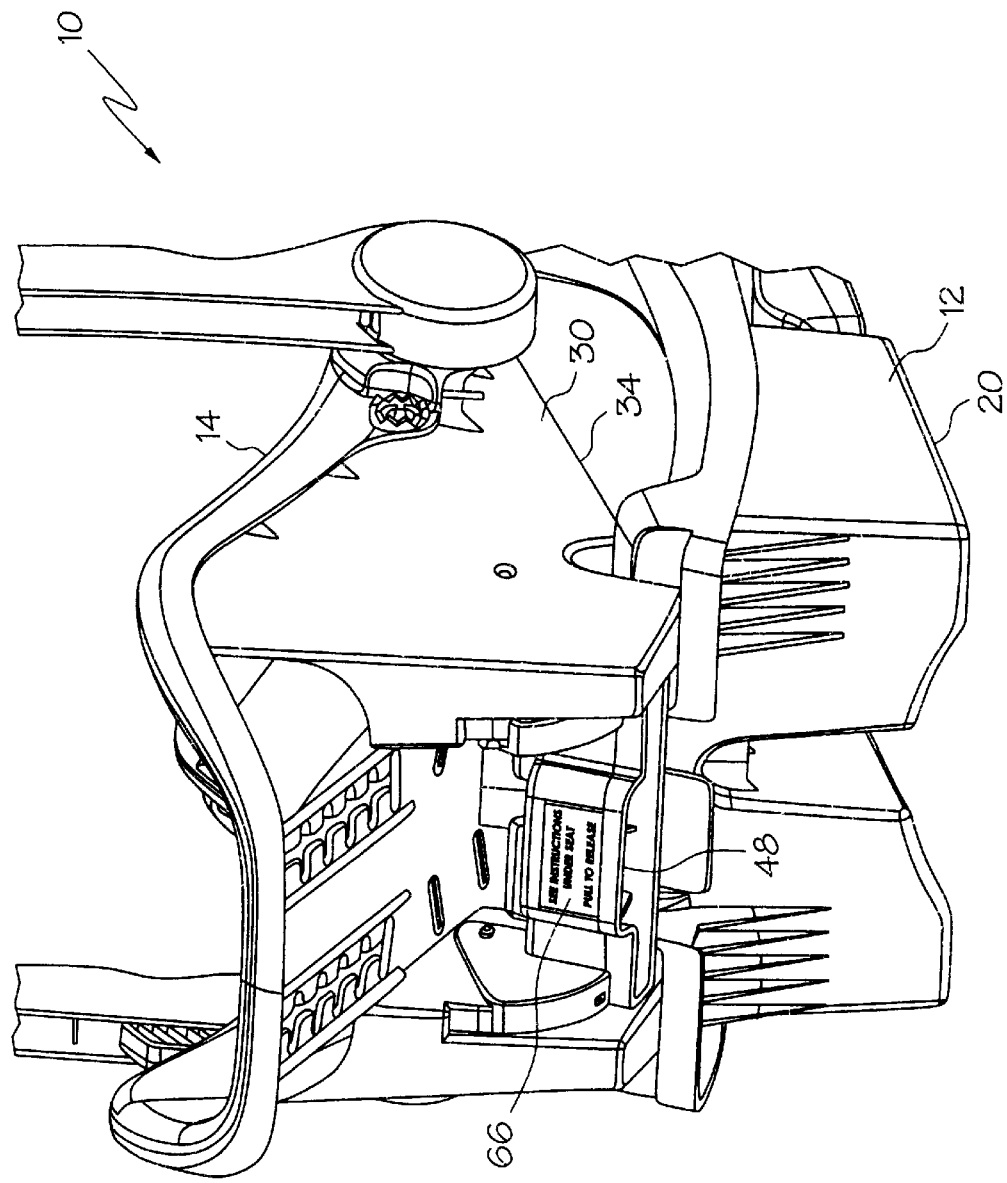
FIG. 4 is a perspective illustration of the system of the prior figures taken from the head end.
Figure 5:
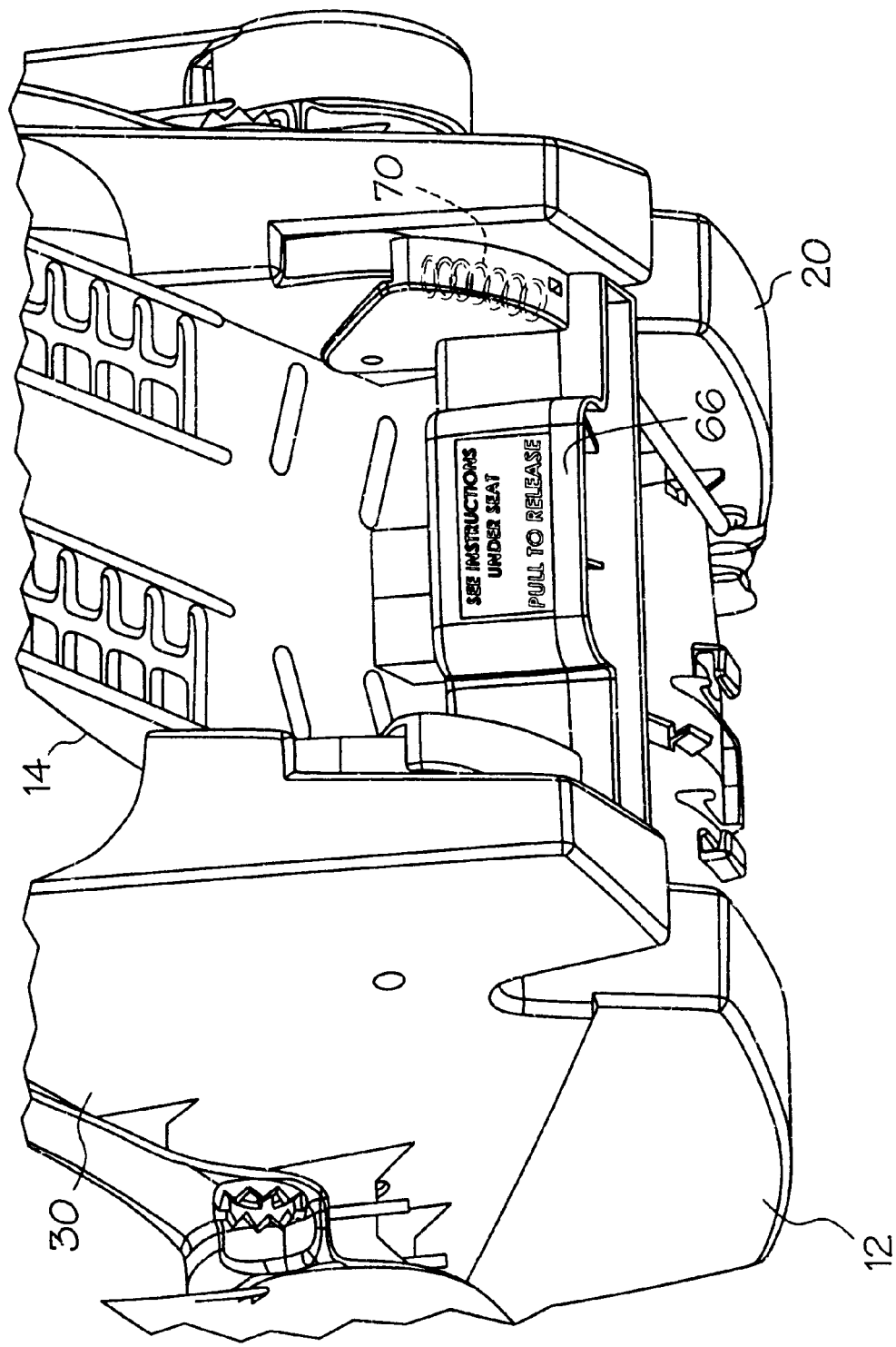
FIG. 5 is an enlarged perspective view of the lower portion thereof similar to FIG. 4.
Figure 6:
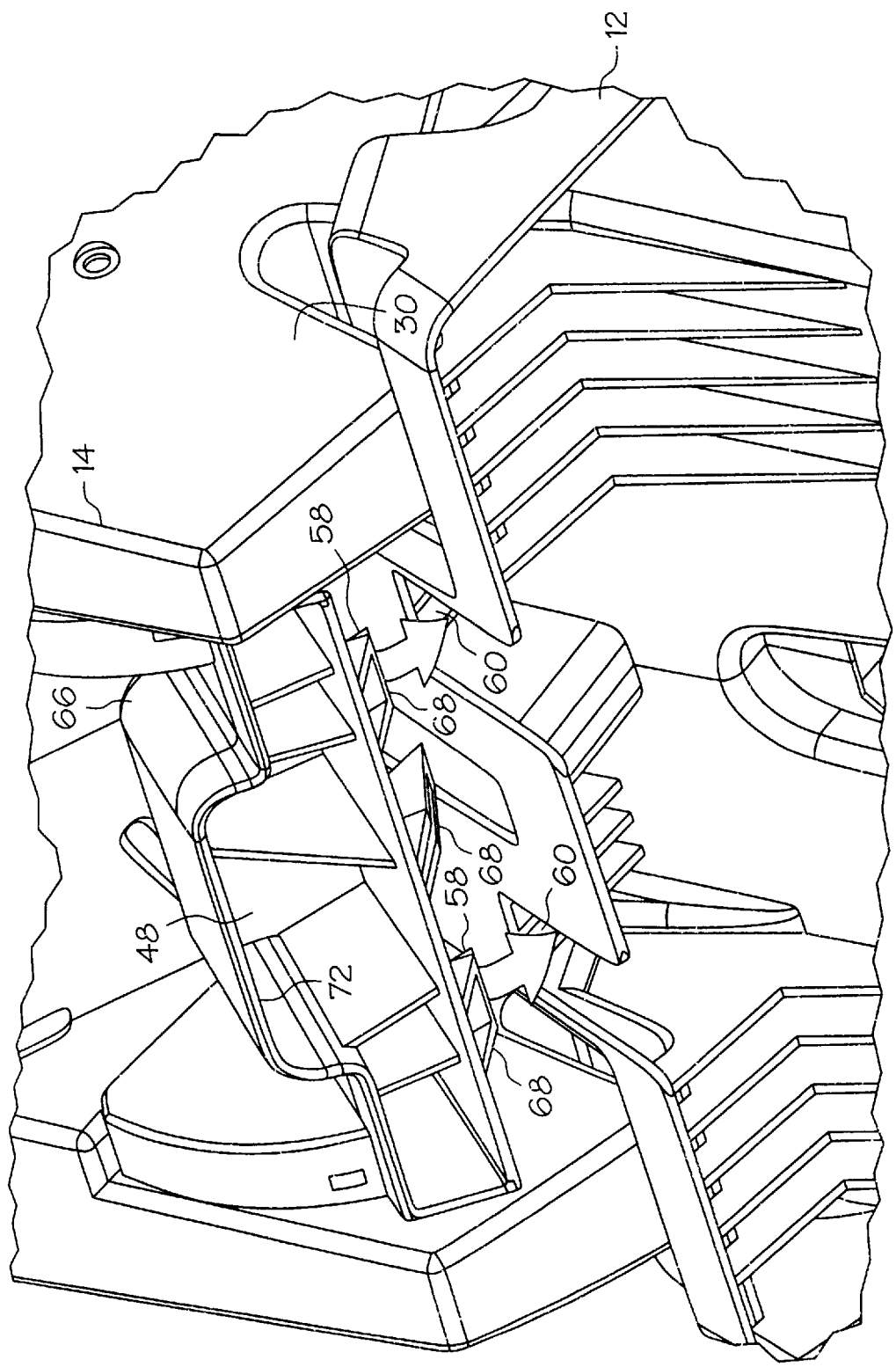
FIG. 6 is a perspective view similar to FIGS. 4 and 5 taken from the bottom thereof.
Figure 7:
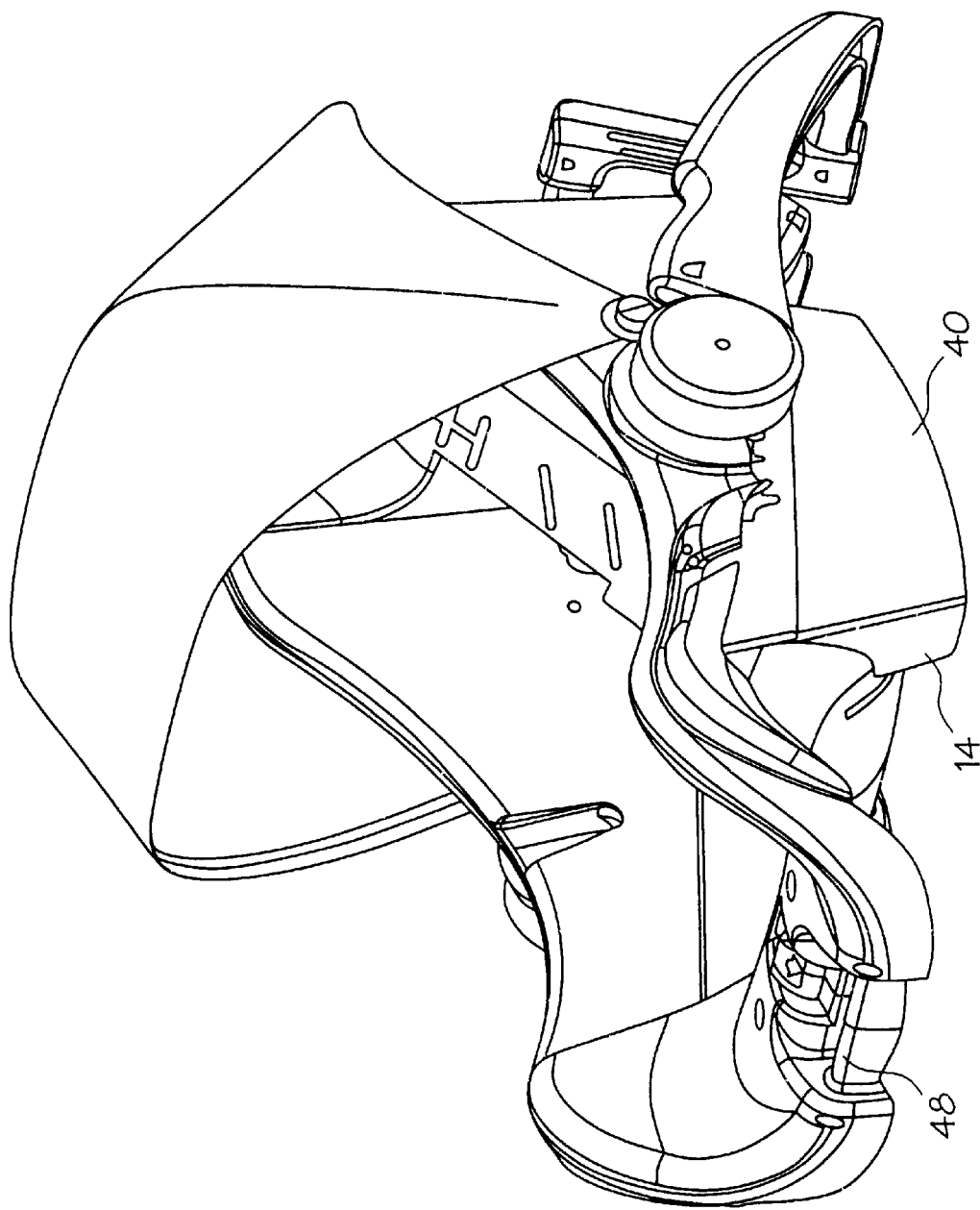
FIG. 7 is a perspective illustration of the infant carrier car seat shown in the system of FIGS. 1 through 6.
Figure 8:
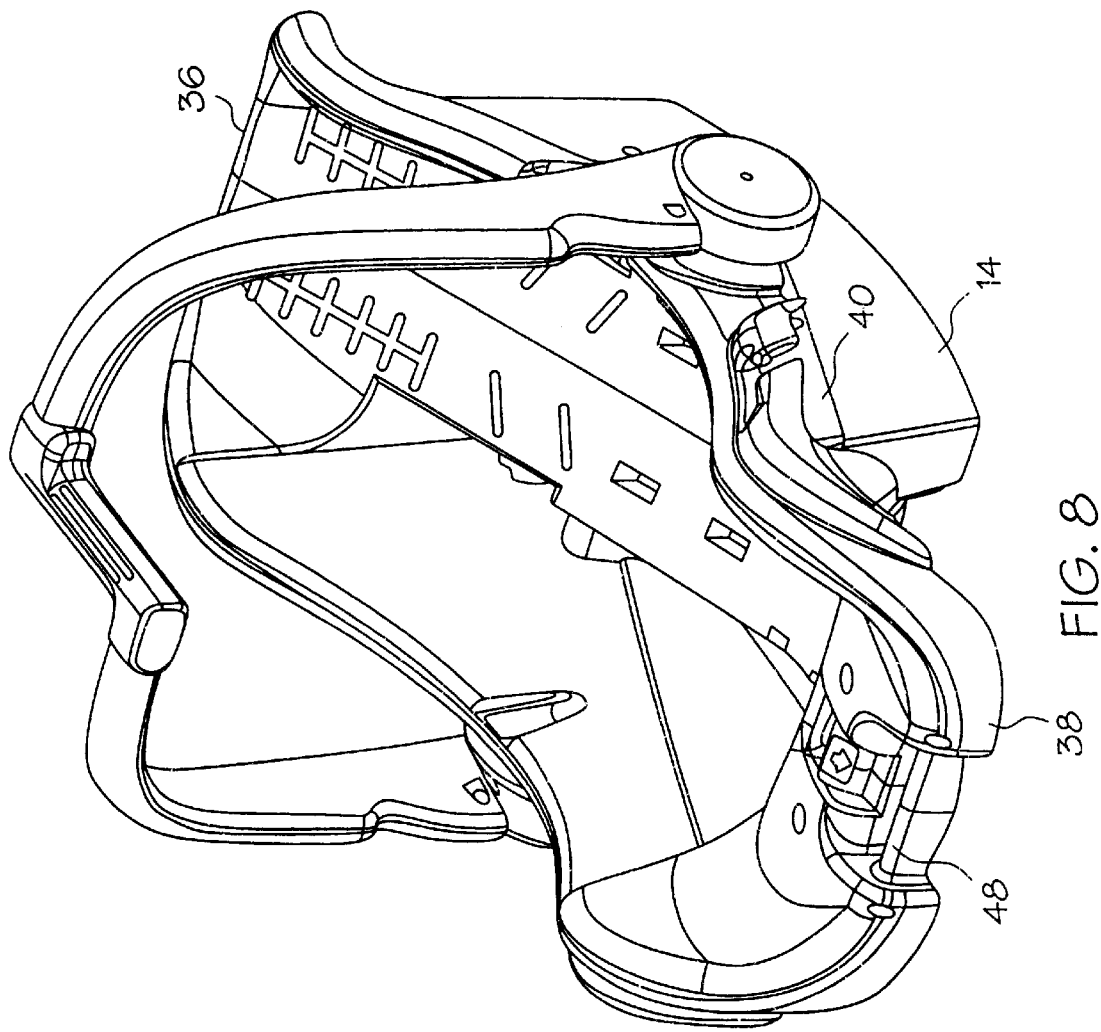
FIG. 8 is a perspective view of the infant carrier shown in FIG. 7 but with the canopy removed.
Figure 9:
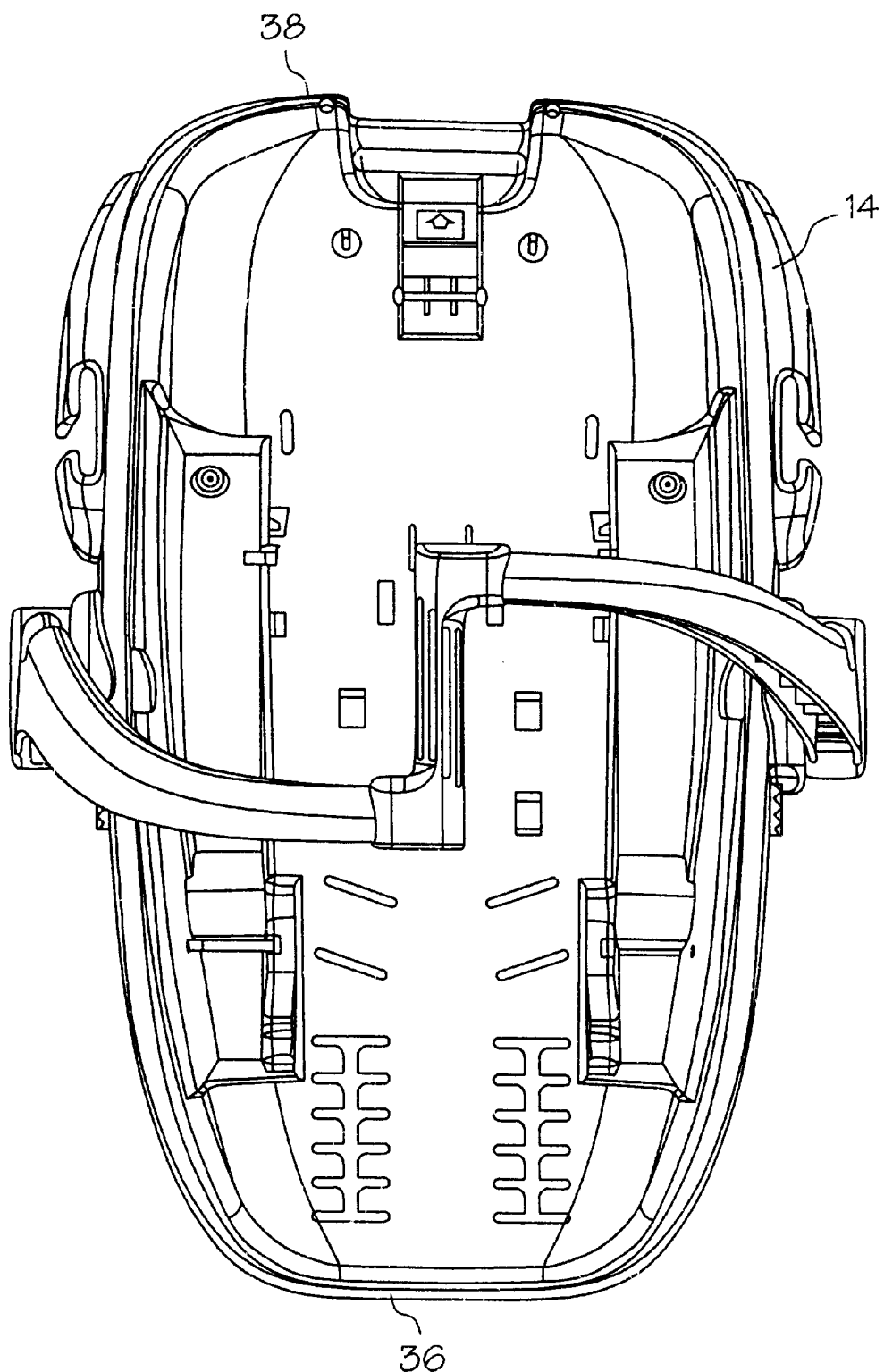
FIG. 9 is a top elevational view of the infant carrier of FIGS. 7 and 8.
Figure 10:
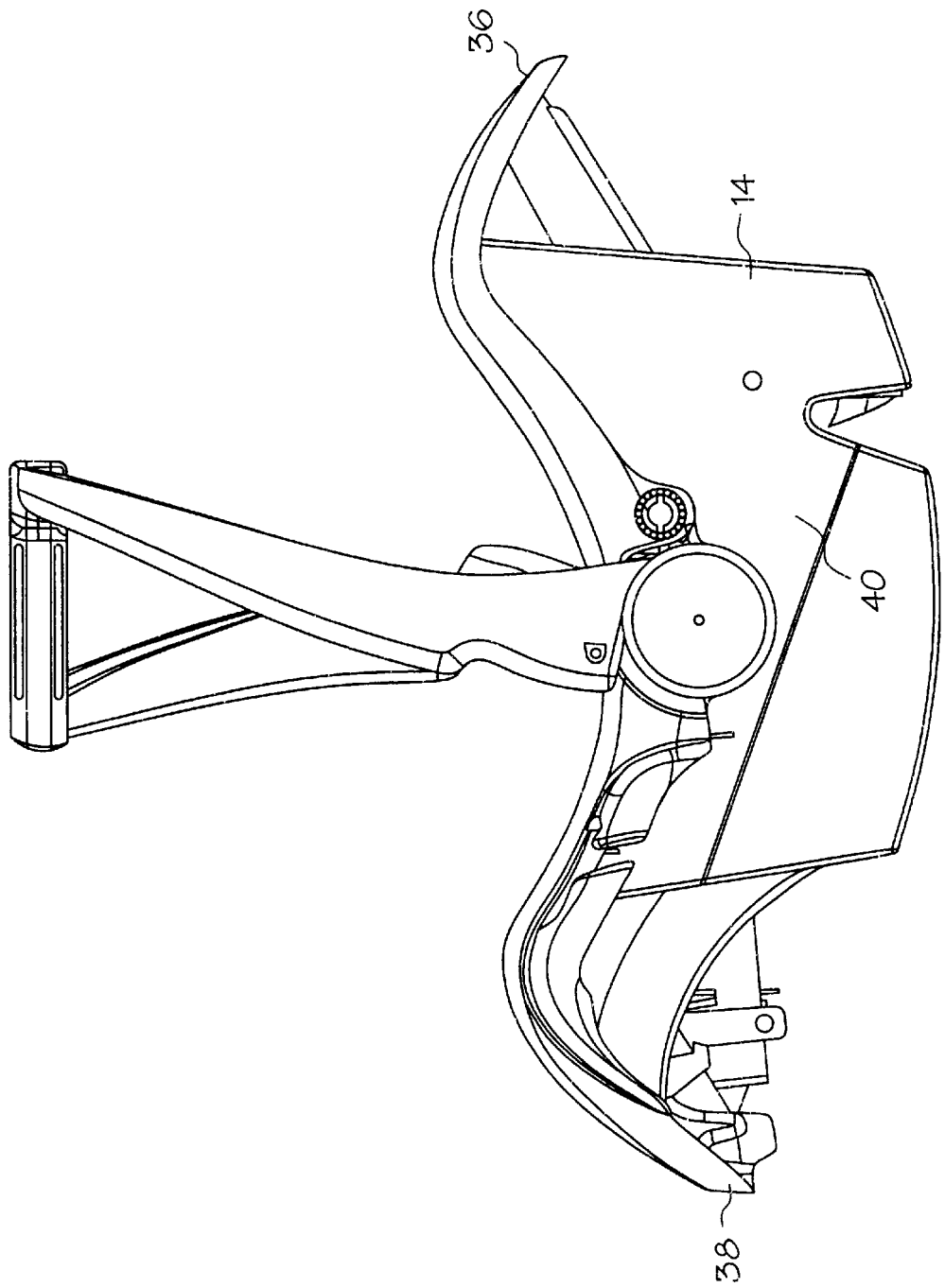
FIG. 10 is a side elevational view of the carrier shown in FIGS. 7 through 9.
Figure 11:
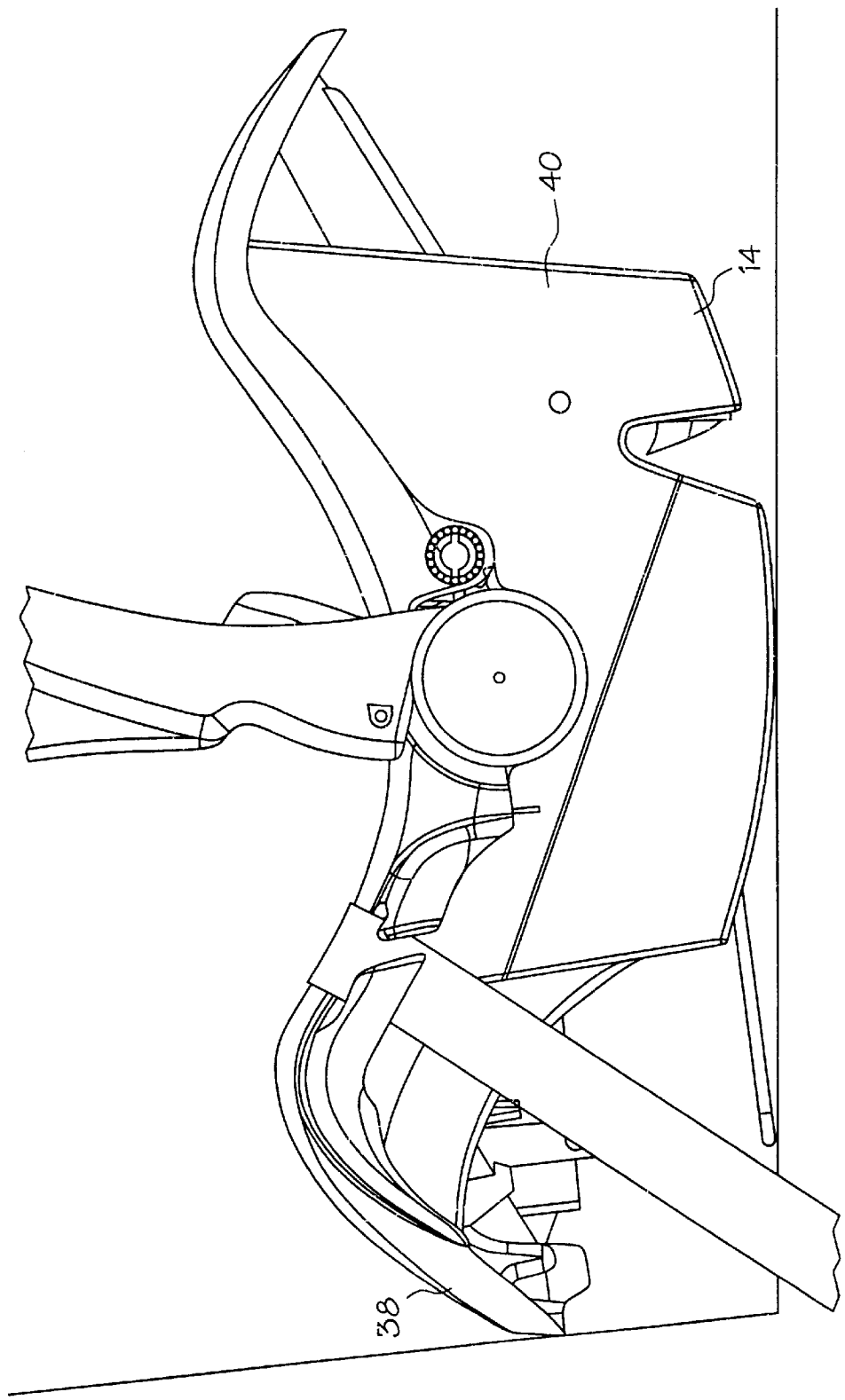
FIG. 11 is a side elevational view similar to FIG. 10 but coupled with respect to a vehicle car seat through a lap safety belt.
Figure 12:
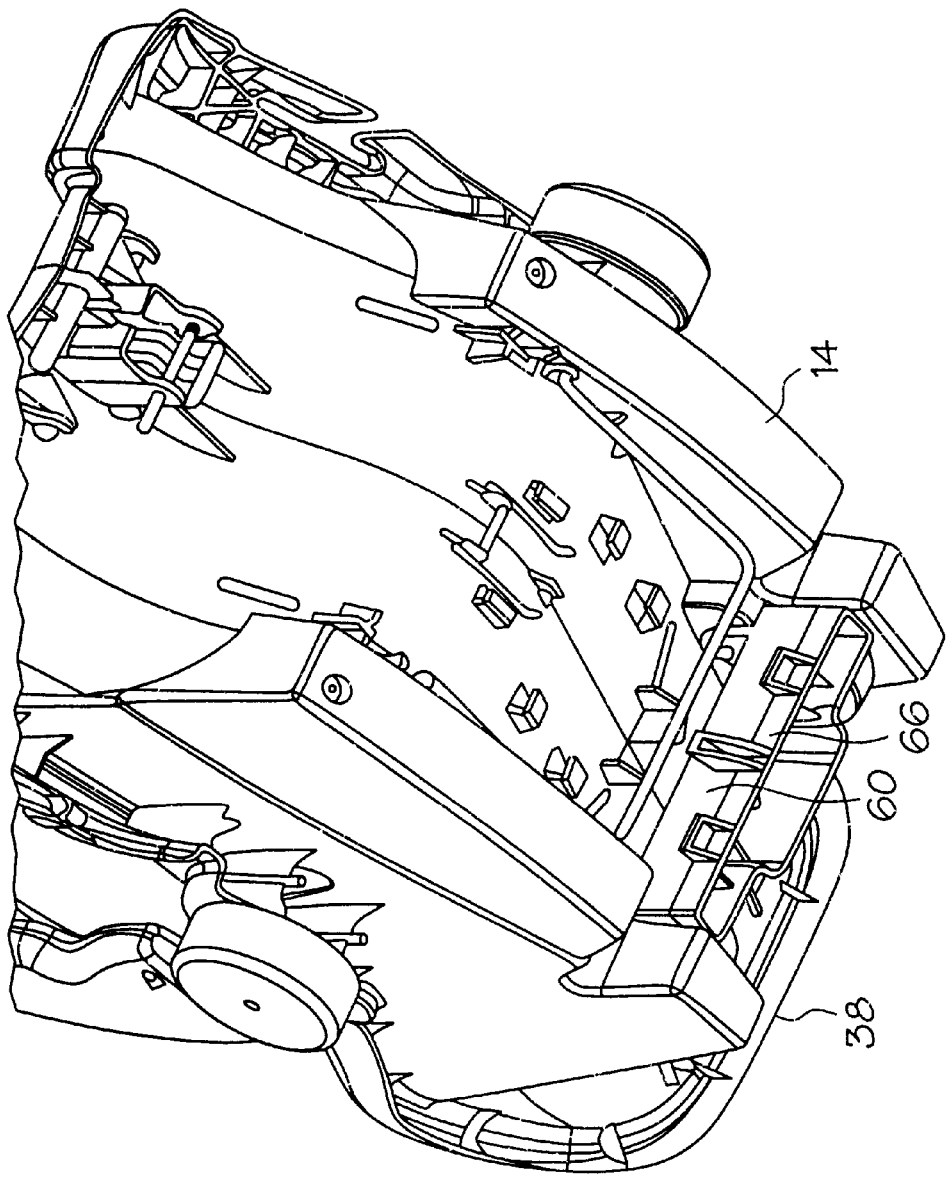
FIG. 12 is a bottom perspective view of the foot end of the infant carrier shown in FIGS. 7 through 11.
Figure 13:
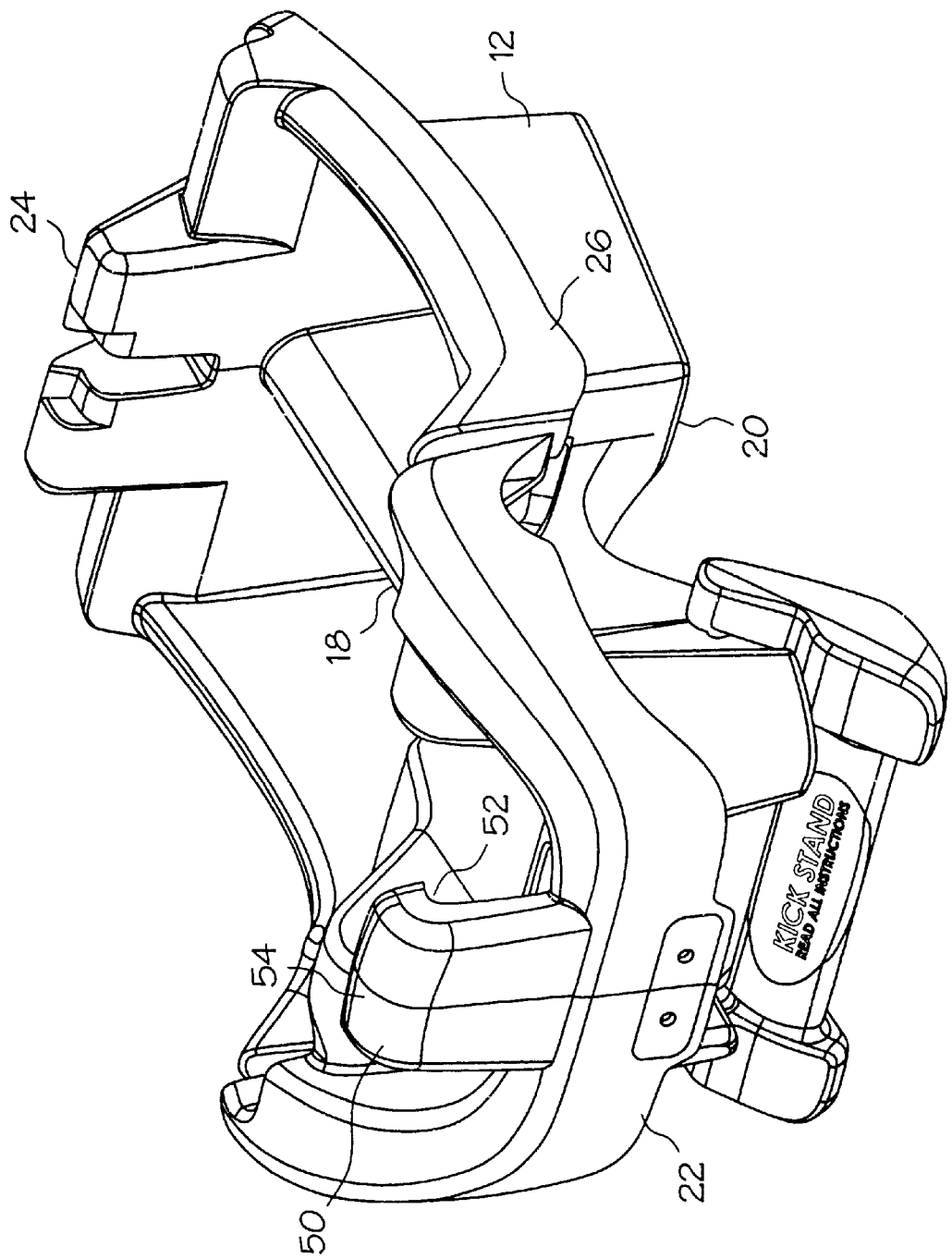
FIG. 13 is a perspective illustration of the base shown in the system of FIGS. 1 through 6.
Figure 14:
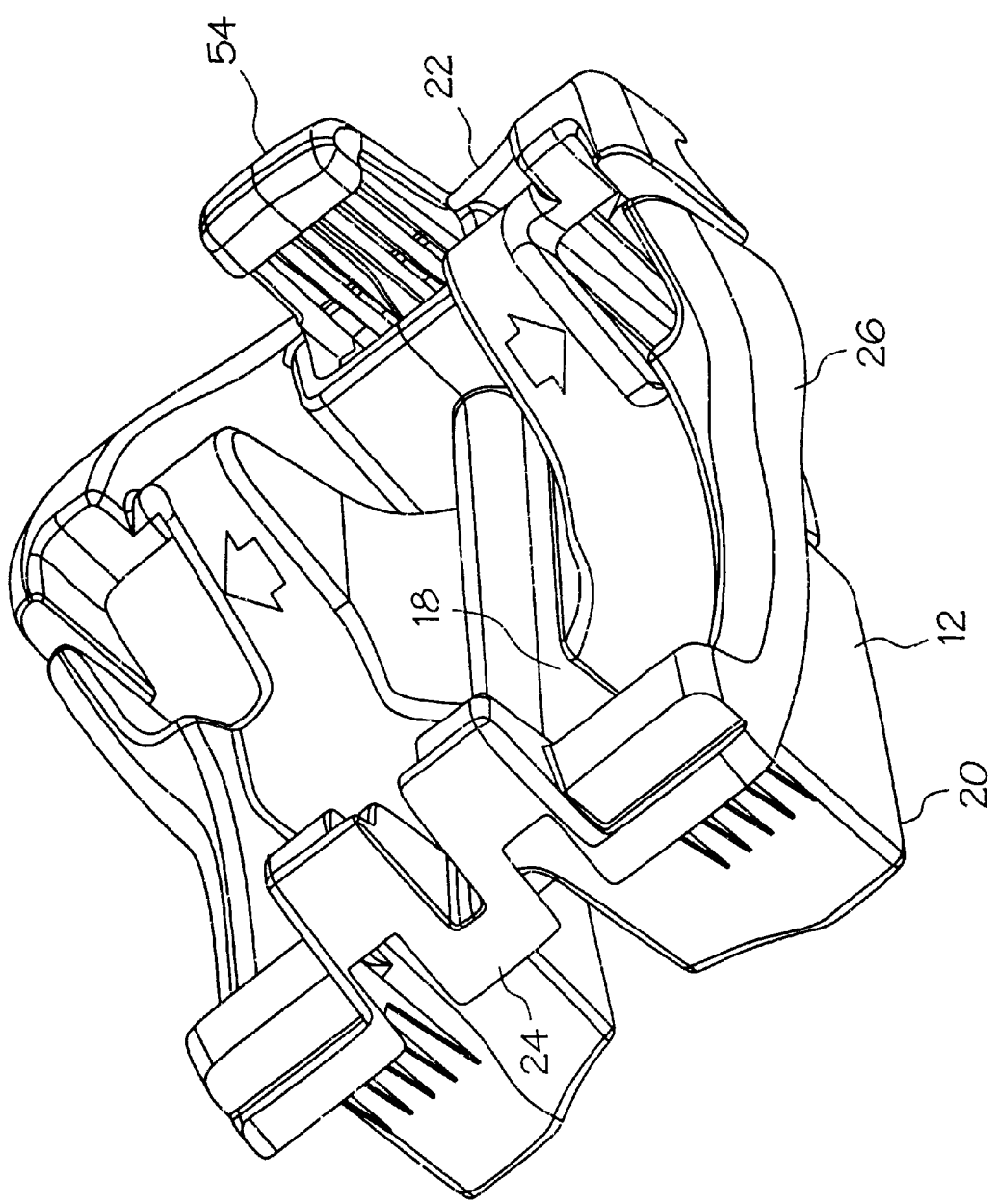
FIG. 14 is a perspective illustration similar to FIG. 13 but taken from the opposite side thereof.
Figure 15:
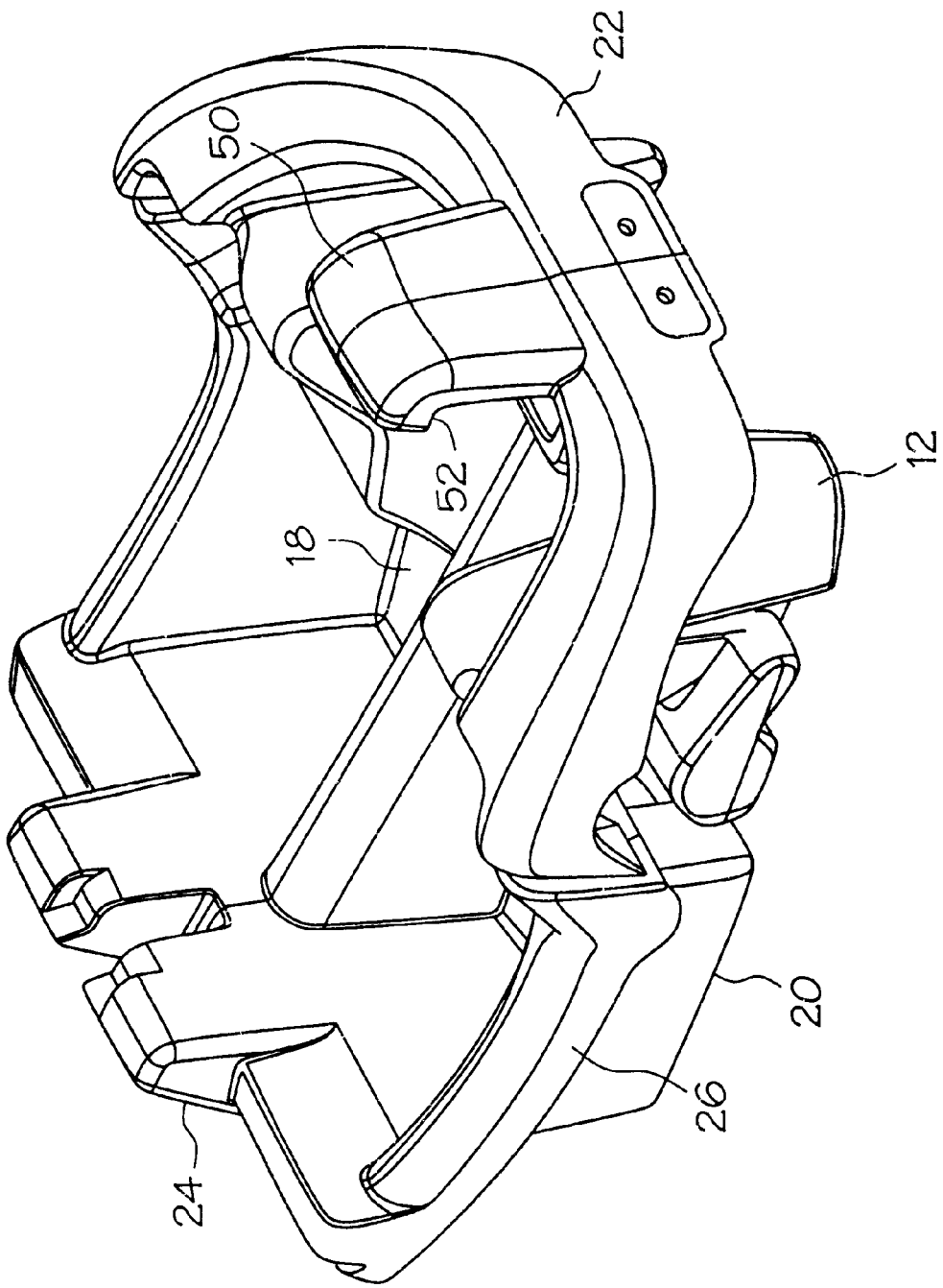
FIG. 15 is a perspective view similar to FIGS. 13 and 14 but with the angle adjustment leg retracted.

With reference now to the drawings, and in particular to FIG. 1 thereof, the preferred embodiment of the new and improved infant carrier base positionable on a vehicle seat for coupling and uncoupling with respect to an infant carrier embodying the principles and concepts of the present invention and generally designated by the reference numeral 10 will be described.

The present invention, an infant carrier base positionable on a vehicle seat for coupling and uncoupling with respect to an infant carrier 10 is comprised of a plurality of components. Such components in their broadest context include a base and coupling mechanisms on the base. Such components are individually configured and correlated with respect to each other so as to attain the desired objective.

The new and improved infant carrier and base system 10 for the safe and convenient coupling and uncoupling between the base 12 and the infant carrier 14 and between the base and the seat 16 of a vehicle through a seat belt 18 includes a base 12.

The base 12 has an upper surface 18 for the receipt of an infant carrier 14 thereon. A lower surface 20 is provided for being received upon the seat 16 of a vehicle and retained thereon by a seat belt 18. The base has a foot end 22 and a head end 24. The side walls 22 therebetween are generally parallel.

Next provided is an infant carrier 14. The infant carrier has a frame 30 of a generally rigid material. The upper surface 32 of the carrier is adapted to receive padding with an infant therein, while the lower surface 34 is adapted to be received and releasably supported on the upper surface of the base. The infant carrier has a head end 36 and a foot end 38 with generally parallel sidewalls 40 therebetween.

Coupling mechanisms 44 between the base and infant carrier include a first coupling mechanism 46 and a second coupling mechanism 46.

The first coupling mechanism 46 includes a generally linear horizontal upper edge 48. The upper edge is provided with a semicircular cross section at the foot end of the infant carrier and an inverted J-shaped hook 50 extending upwardly from the foot end of the base. The hook provides an upwardly extending recess with a semicircular upper surface beneath the central curved portion 54 of the hook adapted to receive the upper edge 48 at the foot end of an infant carrier therein.

The second coupling mechanisms 48 include two spaced upwardly facing generally horizontal edge abutment surfaces 58 at the head end of the infant carrier. A downwardly facing abutment surface 60 is provided adjacent to the bottom of the infant carrier proximate to the head end.

Also provided are operator controlled release mechanisms 64. The release mechanisms include a reciprocal block 66. The block is pivotably secured at the head end 36 of the infant carrier 14. The lower end of the block has three inwardly extending fingers 28 with tips forming the abutment surfaces 60 positionable beneath the lower edge of the infant carrier at the head end adjacent to the abutment surfaces. Springs 70 urge the abutment surfaces into mutual locking engagement beneath the base.

The block 66 is provided with an operator grasping area 72. The operator grasping area 72 is adapted to be pivoted outwardly from the infant carrier about a pivot pin 74 against the urging of the springs. In this manner movement of the abutment surfaces of the base from contact with the abutment surfaces of the infant carrier allows pivoting the head end up, rotation of the foot end of the infant carrier with respect to the base, and removal of the foot end of the infant carrier from beneath the J-shaped hook and then total separation of the infant carrier from the base.

This invention is an improved auto base for an infant car seat/carrier. It is less expensive to manufacture than other bases and is designed to better fit more autos. The base consists of a single injection molded part, with warning labels and company identity, and an optional recline leg. No additional parts are required for attachment to the car seat shell other than the single base molding. Other bases on the market often have an extensive mechanism.

The front of the base has a large inverted hook that fits in the front handle recess of the car seat shell. Behind the hook is the auto seat belt path with two small platforms directly behind it on either side of the base. At the rear of the base are two beams and two large protrusions. Each protrusion has a cut on the rear surface to allow engagement of the two hooks on the shell retainer part. The bottom of the base is narrow and rounded at the front to fit deep bucket seats of new autos and also has a gentle trough running the length of the part to fit the hump that is common in the center of many back seats.

To attach the carrier to the base, the handle located at the front center of the carrier is fed underneath the large hook on the front of the base. As the rear of the shell lowers, the shell rails contact the two platforms behind the belt path of the base. This contact acts as a pivot, rotating the front shell handle up into the hook on the base and the slots in the shell rails down onto the beams on the base which locate the shell forward and rearward. When the back of the shell is almost completely lowered, the two outer hooks on the shell retainer part latch into the two cuts on the base protrusions. The shell is now locked onto the base.

To release the shell from the base, the user places one hand on the shell carry handle or near the front of the shell and the other in the hand recess of the hand grip of the shell retainer. As the retainer is pulled, the two springs behind the retainer compress and the retainer pivots rearward, releasing the hooks from the base protrusions and freeing the rear of the carrier. As the user lifts by the retainer, the front handle of the carrier moves down from inside the base hook and the whole carrier can be moved rearward to clear the hook and up and away from the base.

The optional recline leg is molded part that is pivotally attached to he underside of the base near the front. The leg has two positions. One position is rotated up into the base where it is out of the way and allows the base to rest normally on the auto seating surface. The angle of the auto seating surface dictates the angle of the base and the angle of the infant car seat when attached top the base. With the recline leg rotated down and towards the front, it is positioned to elevate the front of the auto base which reclines the infant car seat. This adjustability of the base allows a more correct and comfortable infant car seat back angle in autos with steeply angled seats.

As to the manner of usage and operation of the present invention, the same should be apparent from the above description. Accordingly, no further discussion relating to the manner of usage and operation will be provided.

Additional features of the system in which the present invention may be utilized are disclosed in copending U.S. patent application Ser. Nos. 09/177,176, 09/177,177 and 09/177,179, entitled Handle Adjustment Mechanism, Buckle Latch Mechanism for Infant Car Seat, and Infant Car Seat, all filed concurrently herewith, the subject matter of which is incorporated herein by reference.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A car seat comprising:

a base for positioning upon a vehicle seat;

an infant carrier attachable to the base;

the base having an upper surface for the receipt of the infant carrier thereon, a lower surface for being received upon the vehicle seat and retained thereon by a seat belt, the base having a foot end and a head end;

the infant carrier including a foot end and a head end;

coupling mechanisms for releasably securing the base and infant carrier including a first coupling mechanism and a second coupling mechanism;

the first coupling mechanism including an inverted J-shaped hook extending upwardly from the foot end of the base, the hook providing an upwardly extending recess with an upper surface beneath a curved portion of the hook adapted to receive an upper edge of the foot end of the infant carrier therein; and the second coupling mechanism including alignable abutment surfaces on each of the base and the infant carrier, including a downwardly facing abutment surface at the head end of the base for contacting an upwardly facing abutment surface of the infant carrier, the upwardly facing abutment surface extending from a release block pivotably secured at the head end of the infant carrier, the release block biased toward the downwardly facing abutment surface of the base when the infant carrier is positioned thereon, the release block including a grip portion for pivoting the release block away from the abutment surface of the base such that the abutment surface of the release block clears the abutment surface of the base and for pivoting the upper edge of the infant carrier out from the hook recess to enable the infant carrier to be released from the base.

2. The car seat of claim 1 wherein springs are provided between the release block and the base for biasing the release block toward the abutment surface of the base.

3. The car seat of claim 1 wherein the second coupling mechanism includes two downwardly facing abutment surfaces at the head end of the base and two upwardly facing abutment surfaces extending from the release block of the infant carrier.

4. The car seat of claim 1 wherein the abutment surface of the infant carrier is unitary with the release block.

* * * * *